(12) United States Patent
Kim

(10) Patent No.: US 7,931,256 B2
(45) Date of Patent: Apr. 26, 2011

(54) HYBRID HUMIDIFIER FOR A FUEL CELL

(75) Inventor: Hyun Yoo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1197 days.

(21) Appl. No.: 11/600,668

(22) Filed: Nov. 15, 2006

(65) Prior Publication Data

US 2008/0079180 A1 Apr. 3, 2008

(30) Foreign Application Priority Data

Sep. 28, 2006 (KR) .................. 10-2006-0095125

(51) Int. Cl.
*B01F 3/04* (2006.01)

(52) U.S. Cl. ........................... 261/104; 261/107

(58) Field of Classification Search ............ 261/99, 261/101, 102, 104, 107
See application file for complete search history.

(56) References Cited

U.S. PATENT DOCUMENTS

| | | | |
|---|---|---|---|
| 3,735,559 A * | 5/1973 | Salemme | 95/52 |
| 4,146,597 A * | 3/1979 | Eckstein et al. | 261/104 |
| 5,996,976 A * | 12/1999 | Murphy et al. | 261/104 |
| 6,169,852 B1 | 1/2001 | Liao et al. | |
| 6,554,261 B2 * | 4/2003 | Katagiri et al. | 261/154 |
| 6,669,177 B2 * | 12/2003 | Shimanuki et al. | 261/96 |
| 6,755,399 B2 * | 6/2004 | Shimanuki et al. | 261/104 |
| 6,805,988 B2 * | 10/2004 | Shimanuki et al. | 429/34 |
| 7,401,768 B2 * | 7/2008 | Kim | 261/142 |
| 2002/0024155 A1 * | 2/2002 | Kusano et al. | 261/104 |
| 2002/0098395 A1 * | 7/2002 | Shimanuki et al. | 429/13 |
| 2005/0110172 A1 * | 5/2005 | Tanaka et al. | 261/104 |

FOREIGN PATENT DOCUMENTS

| | | |
|---|---|---|
| JP | 08-329968 | 12/1996 |
| JP | 2001-216981 | 8/2001 |
| JP | 2002-289228 | 10/2002 |
| KR | 2002-0062681 | 7/2002 |
| KR | 10-2002-0084913 A | 11/2002 |
| WO | WO-00/70698 | 11/2000 |

* cited by examiner

*Primary Examiner* — Scott Bushey

(74) *Attorney, Agent, or Firm* — Edwards Angell Palmer & Dodge LLP; Kongsik Kim, Esq.

(57) ABSTRACT

Disclosed in a hybrid humidifier for a fuel cell that has a plurality of humidifying tubes, each of the tubes defining thereon a plurality of through holes. Also disclosed is a method for humidifying dry air in a hybrid humidifier.

7 Claims, 4 Drawing Sheets

[FIG. 1] --Prior Art--
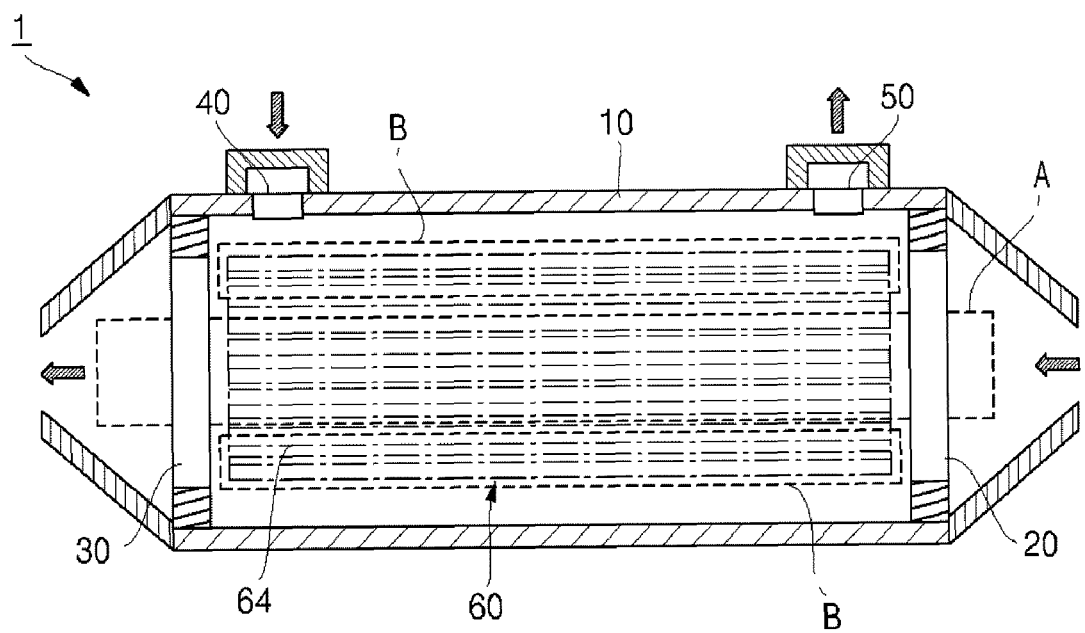
[FIG. 2] --Prior Art--
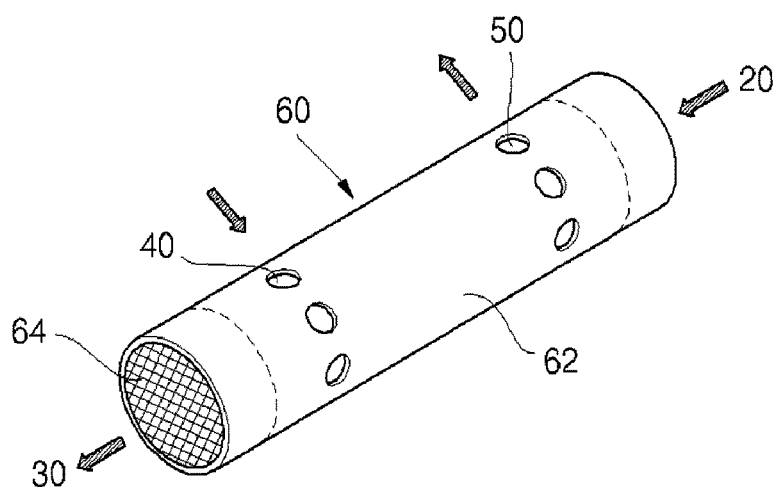

[FIG. 3] --Prior Art--
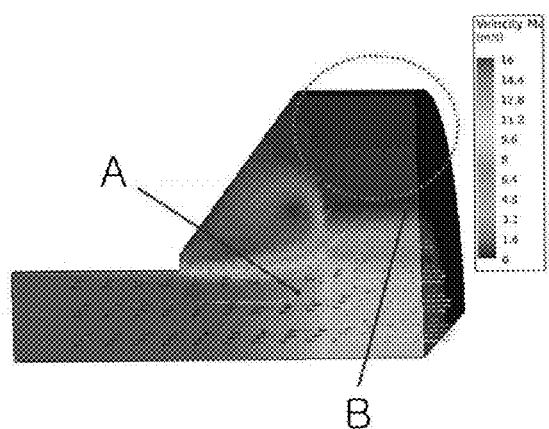
[FIG. 4]
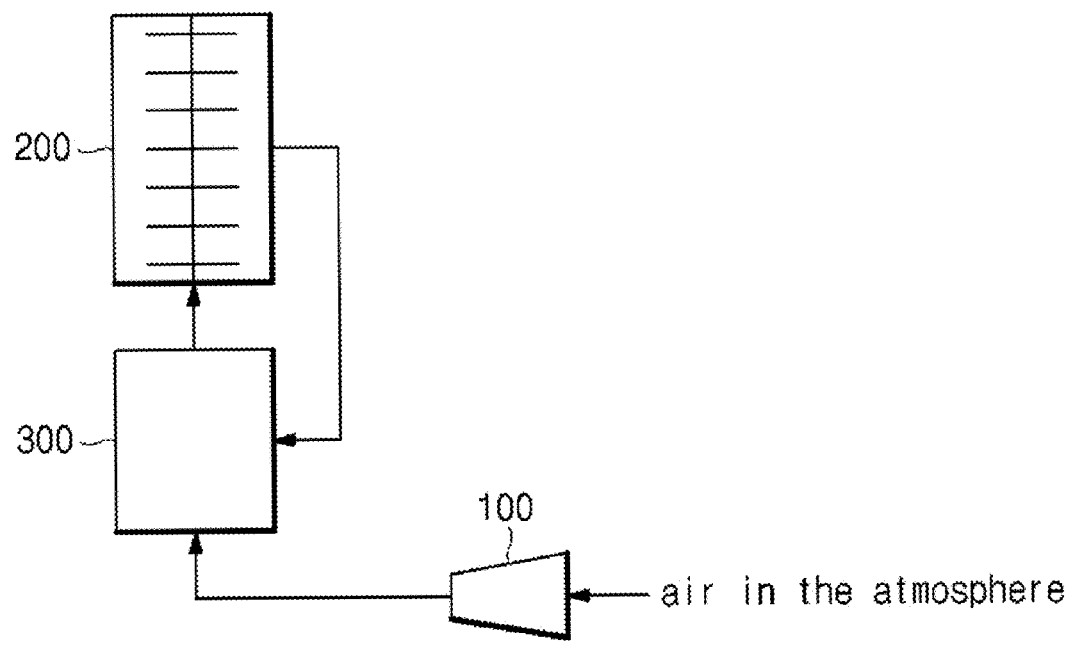

[FIG. 5]
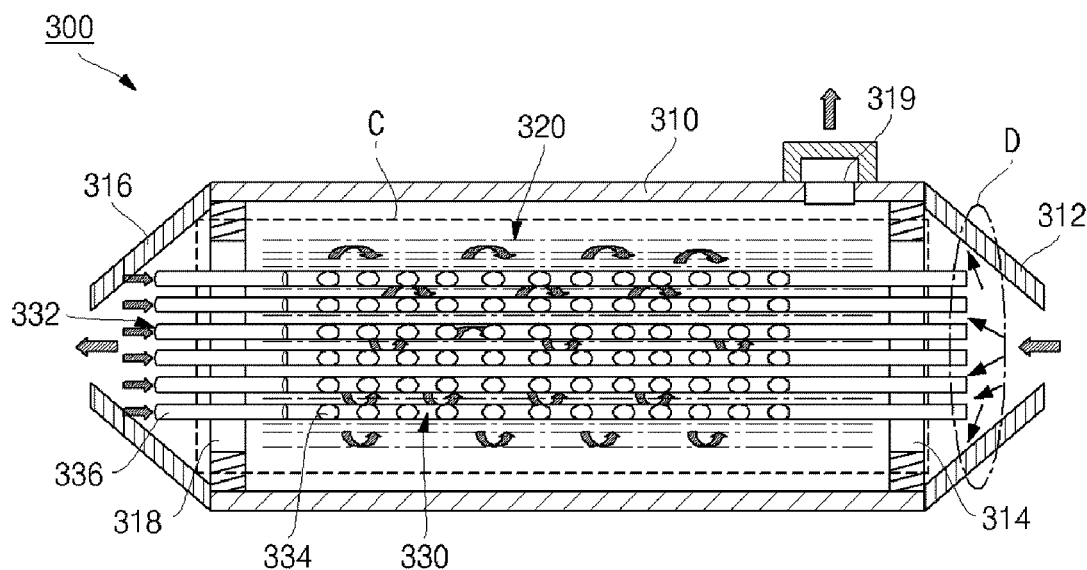
[FIG. 6]
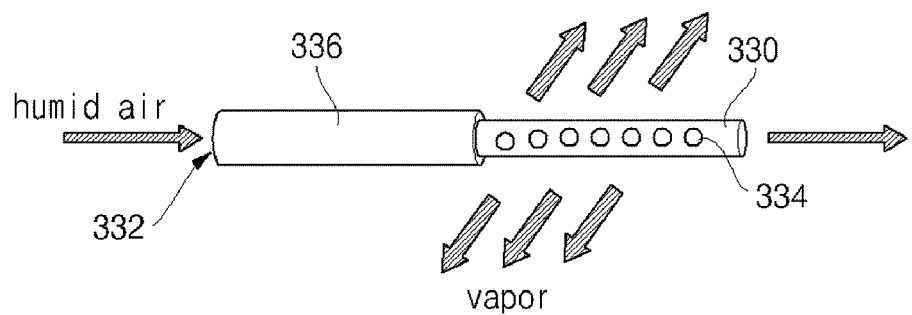

[FIG. 7]
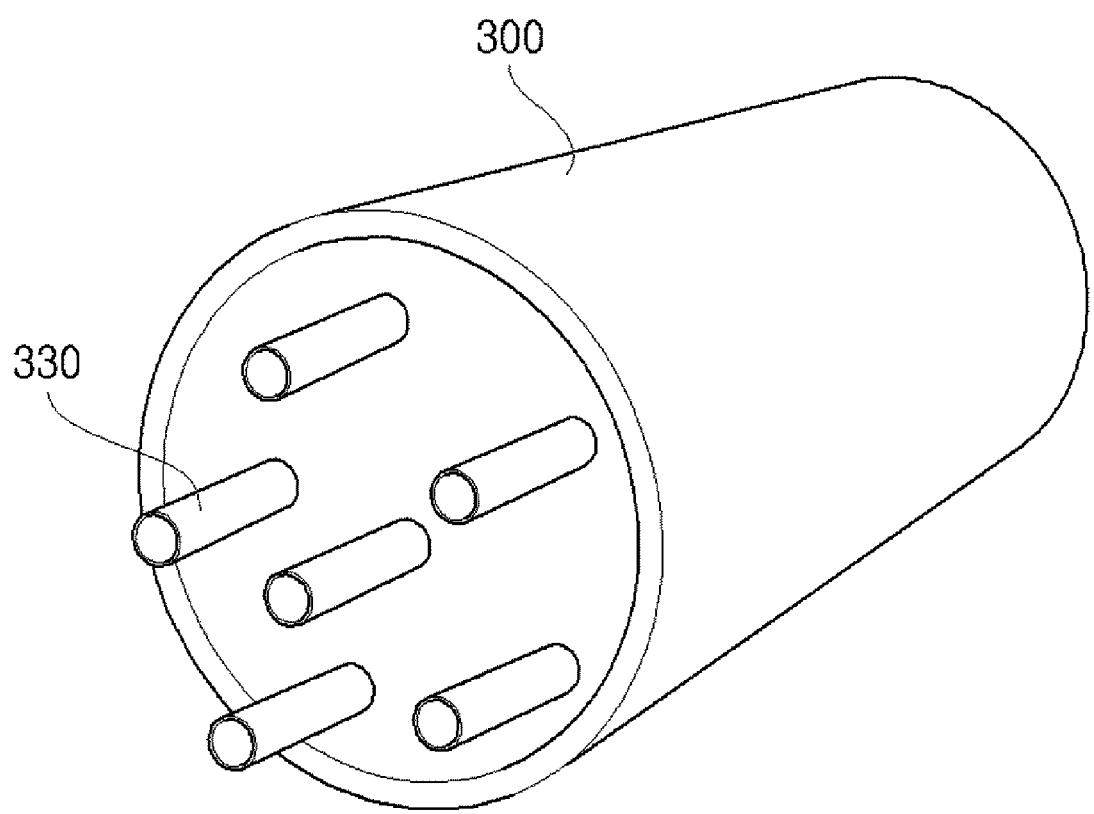

HYBRID HUMIDIFIER FOR A FUEL CELL

CROSS-REFERENCE TO RELATED APPLICATION

This application claims priority to and the benefit of Korean Patent Application No. 10-2006-0095125 filed in the Korean Intellectual Property Office on Sep. 28, 2006, the entire contents of which are incorporated herein by reference.

BACKGROUND OF THE INVENTION (a) Field of the Invention

The present invention relates to a hybrid humidifier for a fuel cell, and more particularly to a hybrid humidifier for a fuel cell in which a plurality of humidifying tubes for supplying humid air discharged from a fuel cell stack are provided so as to uniformly humidify the inside of the humidifier, thereby improving humidifying efficiency.

(b) Description

A fuel cell vehicle is driven by driving force generated by a fuel cell which converts chemical energy generated by reaction of oxygen and hydrogen into electrical energy. For operation of the fuel cell, it is necessary to humidify electrolyte inside the fuel cell.

Generally, dry air out of a vehicle is supplied to fuel cell of the vehicle, and the dry air is humidified by a humidifier and then supplied to a fuel cell stack. The humidifier humidifies the dry air supplied from the outside using the hot and humid air that has been used in the reaction inside the fuel cell stack.

Although there are various humidifiers using a variety of humidification methods, such as supersonic humidification, steam humidification, evaporation type humidification, etc., humidifiers requiring smaller space and consuming less electric energy are preferred for a fuel cell. For this reason, humidifiers using an ultrafiltration membrane have been widely used for a fuel cell.

FIG. 1 is a cross sectional view of a conventional ultrafiltration humidifier, FIG. 2 is a perspective view of an ultrafiltration membrane module of FIG. 1, and FIG. 3 is a drawing showing air flow of the ultrafiltration membrane humidifier of FIG. 1.

As shown in FIG. 1 and FIG. 2, a conventional ultrafiltration membrane humidifier 1 has, at one side of the housing 10, a first inlet 20 through which dry air is supplied, and at the other side of the housing, a first outlet 30 through which the air humidified within the humidifier 1 is discharged. An ultrafiltration membrane module 60, which includes a plurality of module housings 62 containing an ultrafiltration membrane 64, is inserted into the housing 10.

The housing 10 also includes a second inlet 40 through which the hot and humid air discharged from a fuel cell stack is supplied. The housing 10 also includes a second outlet 50 through which the air humidifying the inside of the humidifier 1 is discharged. Moisture contained in the hot and humid air supplied through the second inlet 40 is separated by a capillary phenomenon of the ultrafiltration membrane 64, and then moves into the ultrafiltration membrane 64. The moved moistures serve to humidify the dry air passing through the ultrafiltration membrane 64 in a longitudinal direction thereof, and the humidified air is discharged through the first outlet 30 and is then supplied to a fuel cell stack.

However, as shown in FIG. 1 and FIG. 3, the dry air supplied from the outside is concentrated at a center portion A of the ultrafiltration membrane module 60 before being supplied to the humidifier, and the humid air spreads so slowly that it is difficult to permeate into the center portion of the ultrafiltration membrane module 60. Although an edge portion B of the humidifier 1 is humid, it has little air to be used for humidification, which deteriorates overall efficiency of the humidifier 1.

In addition, since water generated by the reaction in the fuel cell is supplied to the humidifier along with vapor, the water supplied to the humidifier may be frozen at a cold day so that efficiency may be deteriorated.

In order to recover the deteriorated efficiency, an attempt to use a number of ultrafiltration membranes has been made. However, this has a drawback that requires high manufacturing cost as well as increased size of humidifier.

There is thus a need for an improved hybrid humidifier for a fuel cell that can uniformly pass dry air to the humidifier to increase overall humidifying efficiency.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the present invention provides a hybrid humidifier for a fuel cell, comprising: (a) a housing; (b) an air inlet formed at one end of the housing, through which dry air is supplied; (c) an air outlet formed at the other end of the housing, through which humidified dry air is discharged; and (d) a plurality of humidifying tubes disposed inside the housing, each of the tubes defining thereon a plurality of through holes.

Preferably, each of the humidifying tubes may be spaced from one another so as to avoid interference between the tubes.

Also preferably, through holes may be configured to deliver humid air discharged from a fuel cell stack of the fuel cell.

A preferred hybrid humidifier according to the present invention may further comprise an ultrafiltration membrane module within the housing to deliver moisture discharged from the humidifying tube to the dry air.

Another preferred hybrid humidifier may further comprise a sub outlet through which remained air after humidifying the dry air inside the housing is discharged.

In a preferred embodiment, each of humidifying tubes may suitably be configured to penetrate the air inlet and the air outlet.

Also, each of humidifying tubes penetrating the air outlet may preferably be provided with a tube inserting hole for supplying humid air into the hybrid humidifier in a direction opposite to the direction that the dry air flows in the humidifying tube.

In another preferred embodiment, each of the humidifying tubes penetrating the air outlet may suitably be provided with a heater for heating humid air supplied from the fuel cell stack so as to evaporate the air.

In another aspect, the present invention provides a method of humidifying dry air in a hybrid humidifier of a fuel cell, comprising the steps of: (a) flowing dry air into the humidifier; (b) contacting dry air with end portion of humidifying tubes housed in the humidifier; (c) passing dry air through ultrafiltration membrane module disposed inside the humidifier; and (d) supplying humid air discharged from fuel cell stack to the humidifier in a direction opposite to the direction that the dry air flows in the humidifying tube.

In a preferred embodiment, the method of the present invention may further comprise the step of evaporating the humid air passed through the tube inserting holes.

In another preferred embodiment, the method may further comprise the step of passing the vapors obtained through the evaporation into ultrafiltration membrane.

In still another preferred embodiment, the method may further comprise the step of using the moisture flowing into the ultrafiltration membrane to humidify dry air supplied from the outside of humidifier.

In a further preferred embodiment, the method may further comprise the step of discharging the air deprived of vapors from the humidifier through a sub outlet disposed in the humidifier.

In a further aspect, fuel cells are provided that comprise a described hybrid humidifier.

In a yet further aspect, motor vehicles comprising such fuel cell are provided.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present hybrid humidifier will be particularly useful with a wide variety of motor vehicles.

Other aspects of the invention are discussed infra.

BRIEF DESCRIPTION OF THE DRAWINGS

FIG. 1 is a cross sectional view of a conventional ultrafiltration humidifier.

FIG. 2 is a perspective view of ultrafiltration membrane module of FIG. 1.

FIG. 3 is a diagram showing air flow of the ultrafiltration membrane humidifier of FIG. 1.

FIG. 4 is a diagram showing an air supply line according to an exemplary embodiment of the present invention.

FIG. 5 is a cross sectional view of a hybrid humidifier of FIG. 4.

FIG. 6 is an enlarged view of a humidifying tube of FIG. 5.

FIG. 7 is a perspective view schematically showing an installation state of the humidifying tube of FIG. 5.

Reference numerals set forth in the Drawings includes reference to the following elements as further discussed below:

| 100: air blower | 200: fuel cell stack |
|---|---|
| 300: hybrid humidifier | 310: housing |
| 314: air inlet | 318: air outlet |
| 319: sub outlet | 320: ultrafiltration membrane module |
| 330: humidifying tube | 332: tube inserting hole |
| 334: through hole | 336: heater |

DETAILED DESCRIPTION

As discussed above, in one aspect, the present invention provides a hybrid humidifier for a fuel cell, comprising: (a) a housing; (b) an air inlet formed at one end of the housing, through which dry air is supplied; (c) an air outlet formed at the other end of the housing, through which humidified dry air is discharged; and (d) a plurality of humidifying tubes disposed inside the housing, each of the tubes defining thereon a plurality of through holes.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

FIG. 4 is a diagram showing an air supply line according to an exemplary embodiment of the present invention, FIG. 5 is a cross sectional view of a hybrid humidifier of FIG. 4, FIG. 6 is an enlarged view of a humidifying tube of FIG. 5, and FIG. 7 is a perspective view schematically showing an installation state of the humidifying tube of FIG. 5.

As shown in FIG. 4 to FIG. 7, an air supply line includes an air blower 100 sucking air from the outside of a vehicle, and a hybrid humidifier 300 humidifying air sucked by the air blower 100 with humid air discharged from a fuel cell stack 200 and supplying humidified air to the fuel cell stack 200.

The hybrid humidifier 300 includes a housing 310, preferably in a cylindrical shape, an ultrafiltration membrane module 320 housed within the housing 310 to humidify dry air, and a humidifying tube 330 supplying humid air delivered from the fuel cell stack 200.

An inflow guiding part 312 for guiding dry air delivered from the air blower 100 into the inside of the housing 310 is formed at one end of the housing 310, and an air inlet 314 into which dry air having passed the inflow guiding part 312 flows is provided. An air outlet 318 discharging humidified air is provided, and a discharge guiding part 316 guiding the humidified air to the outside is formed at one side of the housing 310. In addition, a sub outlet 319 is formed at a side of the housing 310, and the air discharged from the humidifying tube 330 and then humidifying the inside of the hybrid humidifier 300 is discharged through the sub outlet 319.

The ultrafiltration membrane module 320 is provided with a plurality of ultrafiltration membrane tubes formed by the porous ultrafiltration membrane (referring to reference numeral 64 of FIG. 2) housed within the housing 310 and separating moisture from the humid air discharged from the humidifying tube 330.

The inside of the hybrid humidifier 300 is filled with the ultrafiltration membrane module 320, so that the dry air flowing into the humidifier 300 can be discharged to the outside only after passing the ultrafiltration membrane module 320. Accordingly, dry air passes through the hybrid humidifier 300 only passing through the ultrafiltration membrane module 320, and dry air is humidified during the process.

As shown in FIG. 6, preferably, the humidifying tube 330 can be formed in a cylindrical shape. A plurality of through holes 334 are formed in the humidifying tube 330. A tube inserting hole 332 is formed at an end of the humidifying tube 330 toward the air outlet 318. The humid air that has been used in the reaction inside and discharged from the fuel cell stack 200 is supplied to the hybrid humidifier 300 through the tube inserting hole 332.

It is preferable that a plurality of the humidifying tubes 330 are arranged to be spaced from one another by a specific distance so as not to interfere with one another, as shown in FIG. 7. Accordingly, vapor can be uniformly discharged into the inside of the hybrid humidifier 300, thereby improving the overall humidifying efficiency.

Suitably, a heater 336 may be provided at a portion of the humidifying tube 330 toward the tube inserting hole 332. The heater 336 is used to heat the humid air having passed the tube inserting hole 332, thereby vaporizing moisture in the air so as to form vapor.

Moisture contained in the humid air is transformed into vapor by the heater 336, and the generated vapor is discharged into the hybrid humidifier 300 together with moisture contained in air supplied from the fuel cell stack 200.

Since the tube inserting hole 332 is provided with the heater 336, moisture and water flowing into the hybrid humidifier 300 are transformed into vapor and then supplied, which can prevent the deterioration of humidifying efficiency due to water freezing around the ultrafiltration membrane.

The size of the through hole 334 is small. Since the vapor passing through the through hole 334 is discharged to a wider area from a narrower area, it can be rapidly discharged. Also, since the vapor is discharged to a relatively wide area in a state that a discharging speed has been increased, moisture can be rapidly diffused to the ultrafiltration membrane module 320. Accordingly, efficiency of the hybrid humidifier 300 can be enhanced.

As shown in FIG. 5, each of the humidifying tubes 330 penetrates the air inlet 314 and the air outlet 318 so as to be extended to the outsides of the air inlet 314 and the air outlet 318. Since the humidifying tubes 330 are extended to the outside of the air inlet 314 and are spaced from one another, the air having passed the inflow guiding part 312 can contact the end parts of the humidifying tubes 330, which changes the directions of air.

Accordingly, since dry air flows into not only a center portion C of the hybrid humidifier 300 but also an edge portion D of the hybrid humidifier 300, an efficiency of the hybrid humidifier 300 can be further enhanced.

It should be understood that those skilled in the art can change and/or adjust the shape (diameter, length, size of the through hole, etc) or the number of the humidifying tube 330 to obtain at least the same efficiency of the hybrid humidifier 300.

According to the preferred embodiments of the present invention, it is not necessary to use excessive ultrafiltration membranes. As a result, the manufacturing cost and the size of the hybrid humidifier can be reduced.

As discussed above, in another aspect, the present invention provides a method of humidifying dry air in a hybrid humidifier of a fuel cell, comprising the steps of: (a) flowing dry air into the humidifier; (b) contacting dry air with end portion of humidifying tubes housed in the humidifier; (c) passing dry air through ultrafiltration membrane module disposed inside the humidifier; and (d) supplying humid air discharged from fuel cell stack to the humidifier in a direction opposite to the direction that the dry air flows in the humidifying tube.

A method for humidifying air in the hybrid humidifier for a fuel cell according to an exemplary embodiment of the present invention will be explained hereinafter.

As shown in FIG. 5, the dry air from the air blower 100 flows into the housing 310 of the hybrid humidifier 300 through the inflow guiding part 312. The dry air can contact the end portions of the humidifying tubes 330 so as to be evenly spread, thereby flowing into the air inlet 314 through various routes (C and D). The dry air flowed through the air inlet 314 passes through the ultrafiltration membrane module 320.

As shown in FIG. 5 and FIG. 6, the high temperature humid air discharged from the fuel cell stack 200 after having participated in the reaction flows into the humidifying tube 330 through the tube inserting hole 332. The moisture contained in the humid air is evaporated by the heater 336. The air containing evaporated vapors is discharged through the through holes 334 formed in a plurality of the humidifying tubes 330 so as to be evenly spread throughout the ultrafiltration membrane module 320.

The vapors contained in the discharged air flow into the ultrafiltration membrane by a capillary phenomenon, and the moisture flowing into the ultrafiltration membrane is used to humidify dry air supplied from the outside.

The air deprived of vapors is discharged from the hybrid humidifier 300 through the sub outlet 319, thereby being discharged to the outside of a vehicle. To the contrary, the dry air supplied from the outside is humidified while passing through the ultrafiltration membrane module 320, passes through the air outlet 318 in a humid state, is discharged from the hybrid humidifier 300 through the discharge guiding part 316, and is supplied to a fuel cell stack.

As described above, since humidifying tubes for supplying humid air are disposed between the ultrafiltration membrane module in a hybrid humidifier, the dry air flowed in the humidifier can be uniformly humidified, enhancing the overall efficiency of the humidifier.

In addition, the humidifying tubes serve to disperse the air supplied through the air inlet, thereby further enhancing the efficiency of the humidifier.

Furthermore, since the heater is provided to the tube inserting hole of the humidifying tube, moisture and water flowing into the humidifier are transformed into vapors, which can prevent water from being frozen around the ultrafiltration membrane, resulting in no deterioration of efficiency.

Also, humidifying efficiency can be further adjusted or improved by optimizing the shape and the number of the humidifying tube. Since humid air flowing into the humidifying tubes is dispersed by the through hole, dispersion speed can be increased, thereby further enhancing humidifying efficiency.

Since overall efficiency of the humidifier is enhanced by employing the humidifying tubes, it does not need to use excessively the ultrafiltration membranes, which reduces manufacturing cost and the size of the humidifier.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hybrid humidifier for a fuel cell, comprising:
    a housing having an air inlet formed at one end thereof, through which dry air is supplied and an air outlet formed at the other end thereof, through which humidified dry air is discharged;
    an ultrafiltration membrane module disposed within the housing to allow the dry air to flow therein; and
    a plurality of humidifying tubes in which humid air flows, the plurality of humidifying tubes being disposed in the ultrafiltration membrane module, each of the tubes having a plurality of through holes formed thereon,
    wherein moisture discharged from the humidifying tubes is delivered to the dry air that flows in the ultrafiltration membrane module,
    wherein each of the humidifying tubes is configured to penetrate the air inlet and the air outlet, and
    wherein each of the humidifying tubes penetrating the air outlet is provided with a heater for heating humid air supplied from the fuel cell stack.

2. The hybrid humidifier of claim 1, wherein the humidifying tubes are spaced from each other.

3. The hybrid humidifier of claim 1, wherein the through holes are configured to deliver humid air discharged from a fuel cell stack of the fuel cell.

4. The hybrid humidifier of claim 1, further comprising a sub outlet through which remained air after humidifying the dry air inside the housing is discharged.

5. The hybrid humidifier of claim 1, wherein each of the humidifying tubes penetrating the air outlet is provided with a tube inserting hole for supplying humid air into the hybrid humidifier in a direction opposite to the direction that the dry air flows in the humidifying tube.

6. A fuel cell comprising a hybrid humidifier, the hybrid humidifier comprising:

- a housing having an air inlet formed at one end thereof, through which dry air is supplied and an air outlet formed at the other end thereof, through which humidified dry air is discharged;
- an ultrafiltration membrane module disposed within the housing to allow the dry air to flow therein; and
- a plurality of humidifying tubes in which humid air flows, the plurality of humidifying tubes being disposed in the ultrafiltration membrane module, each of the tubes having a plurality of through holes formed thereon,
- wherein moisture discharged from the humidifying tubes is delivered to the dry air flowed in the ultrafiltration membrane module,
- wherein each of the humidifying tubes is configured to penetrate the air inlet and the air outlet, and
- wherein each of the humidifying tubes penetrating the air outlet is provided with a heater for heating humid air supplied from the fuel cell stack.

7. A motor vehicle comprising a fuel cell including a hybrid humidifier, the hybrid humidifier comprising:

- a housing having an air inlet formed at one end thereof, through which dry air is supplied and an air outlet formed at the other end thereof, through which humidified dry air is discharged;
- an ultrafiltration membrane module disposed within the housing to allow the dry air to flow therein; and
- a plurality of humidifying tubes in which humid air flows, the plurality of humidifying tubes being disposed in the ultrafiltration membrane module, each of the tubes having a plurality of through holes formed thereon,
- wherein moisture discharged from the humidifying tubes is delivered to the dry air flowed in the ultrafiltration membrane module,
- wherein each of the humidifying tubes is configured to penetrate the air inlet and the air outlet, and
- wherein each of the humidifying tubes penetrating the air outlet is provided with a heater for heating humid air supplied from the fuel cell stack.

* * * * *